US012555948B2

(12) United States Patent
Kusaka

(10) Patent No.: US 12,555,948 B2
(45) Date of Patent: Feb. 17, 2026

(54) CONNECTOR ASSEMBLY

(71) Applicant: HIROSE ELECTRIC CO., LTD., Kanagawa (JP)

(72) Inventor: Kenta Kusaka, Kanagawa (JP)

(73) Assignee: HIROSE ELECTRIC CO., LTD., Kanagawa (JP)

( * ) Notice: Subject to any disclaimer, the term of this patent is extended or adjusted under 35 U.S.C. 154(b) by 432 days.

(21) Appl. No.: 18/450,449

(22) Filed: Aug. 16, 2023

(65) Prior Publication Data

US 2024/0072485 A1 Feb. 29, 2024

(30) Foreign Application Priority Data

Aug. 24, 2022 (JP) ................................. 2022-133559

(51) Int. Cl.

*H01R 12/73* (2011.01)
*H01R 12/71* (2011.01)
*H01R 13/20* (2006.01)
*H01R 13/52* (2006.01)

(52) U.S. Cl.

CPC ....... *H01R 13/5219* (2013.01); *H01R 12/716* (2013.01)

(58) Field of Classification Search

CPC ...... H01R 12/716; H01R 12/73; H01R 13/20; H01R 13/5219
USPC ........................................................... 439/74
See application file for complete search history.

(56) References Cited

U.S. PATENT DOCUMENTS

| | | | | |
|---|---|---|---|---|
| 6,457,991 | B1 * | 10/2002 | Yu | H01R 13/641 439/660 |
| 8,840,433 | B2 * | 9/2014 | Ho | H01R 4/02 439/74 |
| 8,845,339 | B2 * | 9/2014 | Ono | H01R 12/73 439/74 |
| 2006/0264075 | A1 * | 11/2006 | Obikane | H01R 24/60 439/74 |
| 2007/0026708 | A1 * | 2/2007 | Shiroyama | H01R 12/716 439/157 |
| 2016/0036145 | A1 * | 2/2016 | Hasegawa | H01R 12/73 439/78 |
| 2016/0294082 | A1 * | 10/2016 | Matsuno | H01R 13/6275 |

(Continued)

FOREIGN PATENT DOCUMENTS

JP 2016-157529 A 9/2016

*Primary Examiner* — Abdullah A Riyami
*Assistant Examiner* — Thang H Nguyen
(74) *Attorney, Agent, or Firm* — RANKIN, HILL & CLARK LLP

(57) ABSTRACT

Provided is a connector assembly including: a first connector; and a second connector fitted to the first connector. The first connector has a first housing and a first terminal held on the first housing. The second connector has a second housing and a second terminal held on the second housing. The first housing has an island-shaped raised portion, a first inner peripheral wall, a first receiving portion, a first outer peripheral wall, and a recessed portion. The second housing has a second inner peripheral wall, an island-shaped recessed portion, a second outer peripheral wall, and a second receiving portion. Upon fitting of the first connector and the second connector, the first terminal is displaced by contact between the first terminal and the second terminal, and part of the displaced first terminal abuts an inner wall of the second outer peripheral wall.

8 Claims, 9 Drawing Sheets

(56) References Cited

U.S. PATENT DOCUMENTS

| | | | | |
|---|---|---|---|---|
| 2018/0138624 | A1* | 5/2018 | Ashibu | H01R 13/2407 |
| 2018/0331444 | A1* | 11/2018 | Ono | H01R 13/504 |
| 2020/0235506 | A1* | 7/2020 | Hosoda | H01R 13/631 |
| 2021/0218196 | A1* | 7/2021 | Shimomura | H01R 13/6594 |
| 2023/0246359 | A1* | 8/2023 | Suzuki | H01R 12/71<br>439/74 |

* cited by examiner

CONNECTOR ASSEMBLY

CROSS-REFERENCE TO RELATED APPLICATION

This application claims priority from Japanese Patent Application No. 2022-133559 filed with the Japan Patent Office on Aug. 24, 2022, the entire content of which is hereby incorporated by reference.

BACKGROUND

1. Technical Field

The present disclosure relates to a connector assembly.

2. Related Art

Small connector assemblies have been used for various goods and types of environment, such as electronic devices including mobile phones and livingware including bicycles, and it has been imperative that a waterproof function is improved for these small connector assemblies. However, at the same time, there has been a demand for further size reduction in the small connector assemblies. For example, it is not easy to employ a new waterproof structure in the small connector assembly, unlike a relatively-large connector which can employ bayonet connection in order to improve the waterproof function.

For example, in order to fulfill the waterproof function in a connector assembly configured such that connectors fixed to circuit boards are in board-to-board connection with each other, a coating agent is generally applied to fill clearances at connection portions between the circuit boards and connector terminals and a connection portion between the first connector and the second connector. However, a problem that the coating agent interferes with electric connection between the connector terminals due to aging is often caused, and there is no proper solution thereto.

For example, a board-to-board connection type small connector assembly has been known, such as a connector assembly disclosed in JP-A-2016-157529. The connector assembly disclosed in JP-A-2016-157529 is specifically a connector assembly of such a type that a first connector and a second connector are fitted to each other at multiple locations, and the waterproof function thereof is improved by a press-fitting structure. The connector assembly disclosed in JP-A-2016-157529 is a multi-fitting connector assembly configured such that a center raised portion of the first connector enters a center recessed portion of the second connector, a contact support wall of the first connector enters a support wall receiving recessed portion of the second connector, and a support wall of the second connector enters a support wall receiving recessed portion of the first connector. In order to improve the waterproof function in such a connector assembly, a structure of press-fitting, upon fitting of the first connector and the second connector, an endless press-fitting protrusion provided on the second connector into an endless press-fitting groove provided in the first connector is employed. According to this press-fitting structure, a portion between a fitting surface of a second housing and a fitting surface of a first housing is sealed, and as a result, an inner portion of the connector assembly surrounded by the press-fitting protrusion is sealed from the outside. Thus, entrance of water into the portion between the fitting surface of the second housing and the fitting surface of the first housing can be reduced.

SUMMARY

A connector assembly according to an embodiment of the present disclosure includes: a first connector; and a second connector fitted to the first connector. The first connector has a first housing and a first terminal held on the first housing. The second connector has a second housing and a second terminal held on the second housing. The first housing has an island-shaped raised portion, a first inner peripheral wall, a first receiving portion, a first outer peripheral wall, and a recessed portion. The island-shaped raised portion protrudes to a fitting side to be fitted to the second connector, and extends along a length direction of the first connector. The first inner peripheral wall protrudes to the fitting side, and surrounds a periphery of the island-shaped raised portion. The first receiving portion is recessed to an opposite side of the fitting side, and is circumferentially formed between the island-shaped raised portion and the first inner peripheral wall. The first outer peripheral wall protrudes to the fitting side, and surrounds a periphery of the first inner peripheral wall. The he recessed portion is recessed to the opposite side of the fitting side, and is circumferentially formed between the first inner peripheral wall and the first outer peripheral wall. The second housing has a second inner peripheral wall, an island-shaped recessed portion, a second outer peripheral wall, and a second receiving portion. The second inner peripheral wall protrudes to a fitting side to be fitted to the first connector, is circumferentially formed, and is received by the first receiving portion upon fitting of the first connector and the second connector. The island-shaped recessed portion is recessed to an opposite side of the fitting side and is formed inside the second inner peripheral wall, and the island-shaped raised portion is fitted in the island-shaped recessed portion upon fitting of the first connector and the second connector. The second outer peripheral wall protrudes to the fitting side, surrounds a periphery of the second inner peripheral wall, and is fitted in the recessed portion upon fitting of the first connector and the second connector. The second receiving portion is recessed to the opposite side of the fitting side and is circumferentially formed between the second inner peripheral wall and the second outer peripheral wall, and the first inner peripheral wall is fitted in the second receiving portion upon fitting of the first connector and the second connector. Upon fitting of the first connector and the second connector, the first terminal is displaced by contact between the first terminal and the second terminal, and part of the displaced first terminal abuts an inner wall of the second outer peripheral wall.

DETAILED DESCRIPTION

Figure 1:
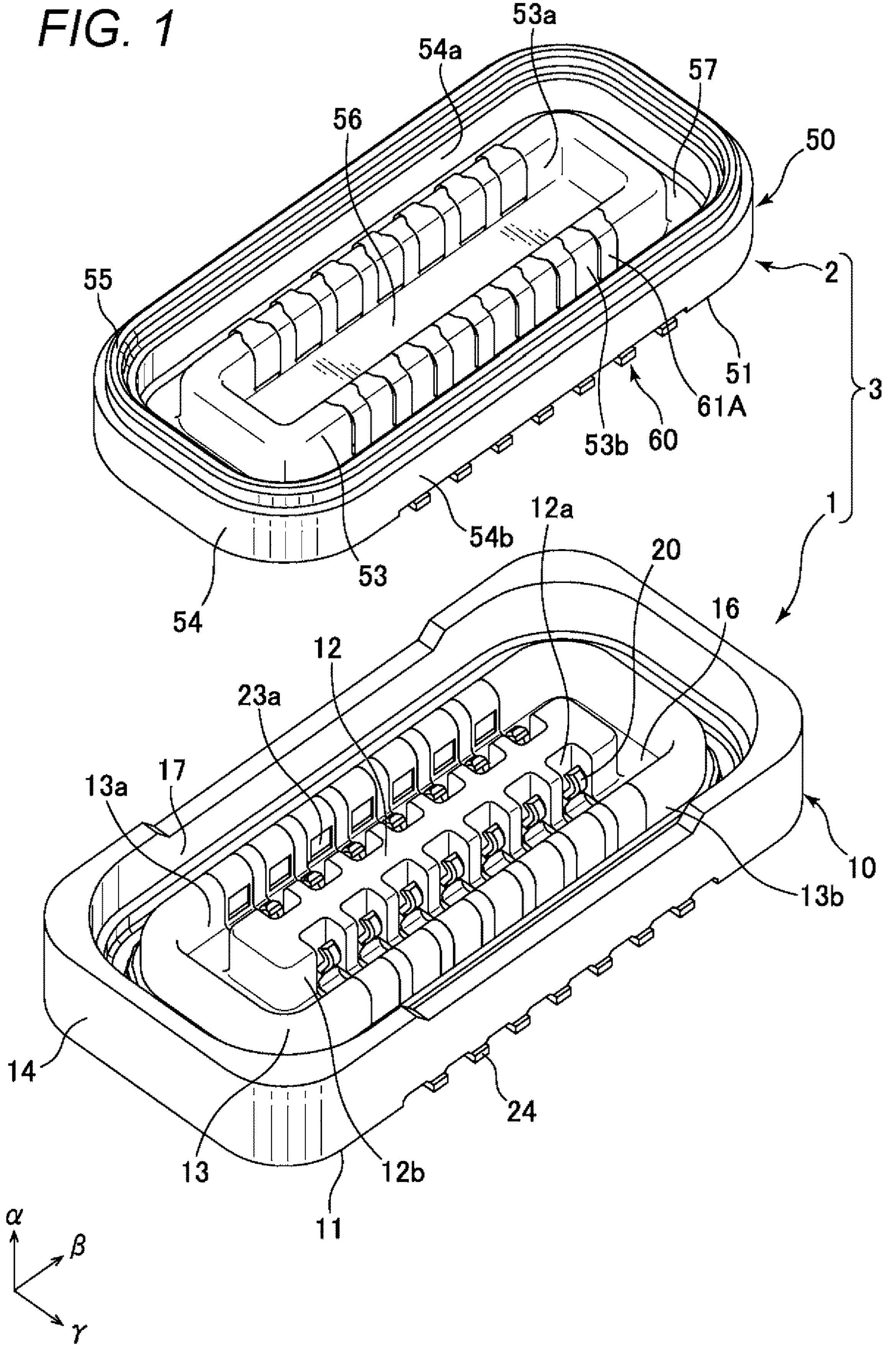
FIG. 1 is a perspective view of a connector assembly according to one embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the connector assembly of JP-A-2016-157529, the press-fitting protrusion needs to be press-fitted in the press-fitting groove in a fitting direction in order to fulfill the waterproof function. For this reason, force which needs to be applied upon fitting of the first connector and the second connector is extremely great, leading to a problem that user's usability is degraded.

The present disclosure is intended to solve these problems of the prior art and to provide a connector assembly configured such that a first connector and a second connector are fitted to each other at multiple locations, the connector assembly being capable of fitting the first connector and the second connector with smaller force while the waterproof function thereof is further improved.

A connector assembly according to one aspect of the present disclosure includes: a first connector; and a second connector fitted to the first connector. The first connector has a first housing and a first terminal held on the first housing. The second connector has a second housing and a second terminal held on the second housing. The first housing has an island-shaped raised portion, a first inner peripheral wall, a first receiving portion, a first outer peripheral wall, and a recessed portion. The island-shaped raised portion protrudes to a fitting side to be fitted to the second connector, and extends along a length direction of the first connector. The first inner peripheral wall protrudes to the fitting side, and surrounds a periphery of the island-shaped raised portion. The first receiving portion is recessed to an opposite side of the fitting side, and is circumferentially formed between the island-shaped raised portion and the first inner peripheral wall. The first outer peripheral wall protrudes to the fitting side, and surrounds a periphery of the first inner peripheral wall. The he recessed portion is recessed to the opposite side of the fitting side, and is circumferentially formed between the first inner peripheral wall and the first outer peripheral wall. The second housing has a second inner peripheral wall, an island-shaped recessed portion, a second outer peripheral wall, and a second receiving portion. The second inner peripheral wall protrudes to a fitting side to be fitted to the first connector, is circumferentially formed, and is received by the first receiving portion upon fitting of the first connector and the second connector. The island-shaped recessed portion is recessed to an opposite side of the fitting side and is formed inside the second inner peripheral wall, and the island-shaped raised portion is fitted in the island-shaped recessed portion upon fitting of the first connector and the second connector. The second outer peripheral wall protrudes to the fitting side, surrounds a periphery of the second inner peripheral wall, and is fitted in the recessed portion upon fitting of the first connector and the second connector. The second receiving portion is recessed to the opposite side of the fitting side and is circumferentially formed between the second inner peripheral wall and the second outer peripheral wall, and the first inner peripheral wall is fitted in the second receiving portion upon fitting of the first connector and the second connector. Upon fitting of the first connector and the second connector, the first terminal is displaced by contact between the first terminal and the second terminal, and part of the displaced first terminal abuts an inner wall of the second outer peripheral wall.

In the connector assembly according to the one aspect of the present disclosure, upon fitting of the first connector and the second connector, the first inner peripheral wall is displaced together with the first terminal, and at least part of the displaced first inner peripheral wall abuts the inner wall of the second outer peripheral wall.

According to the connector assembly of the present disclosure, the part of the displaced first terminal and at least part of the first housing holding the first terminal abuts an inner wall of the second connector so that a water entrance path can be blocked and the waterproof function can be improved. Moreover, force to be applied in a fitting direction to displace the first terminal can be concentrated on substantially a point on the first terminal, and the force in the fitting direction can be converted into force in a width direction. Thus, as compared to a typical structure in which a force application direction (fitting direction) and a press-fitting direction are the same as each other, the first connector and the second connector can be fitted to each other with smaller force, and at the same time, the waterproof function can be fulfilled.

According to the present disclosure, the connector assembly configured such that the first connector and the second connector are fitted to each other at the multiple locations can be provided, the connector assembly being capable of fitting the first connector and the second connector with smaller force while the waterproof function thereof is further improved.

Hereinafter, an exemplary embodiment for carrying out the present disclosure will be described in detail with reference to the drawings. Note that the dimensions, materials, shapes, relative positions, etc. of components described in the following embodiment may be changed according to a device configuration to which the present disclosure is applied or various conditions. Thus, the scope of the present disclosure is not limited to the embodiment specifically described below.

Figure 2:
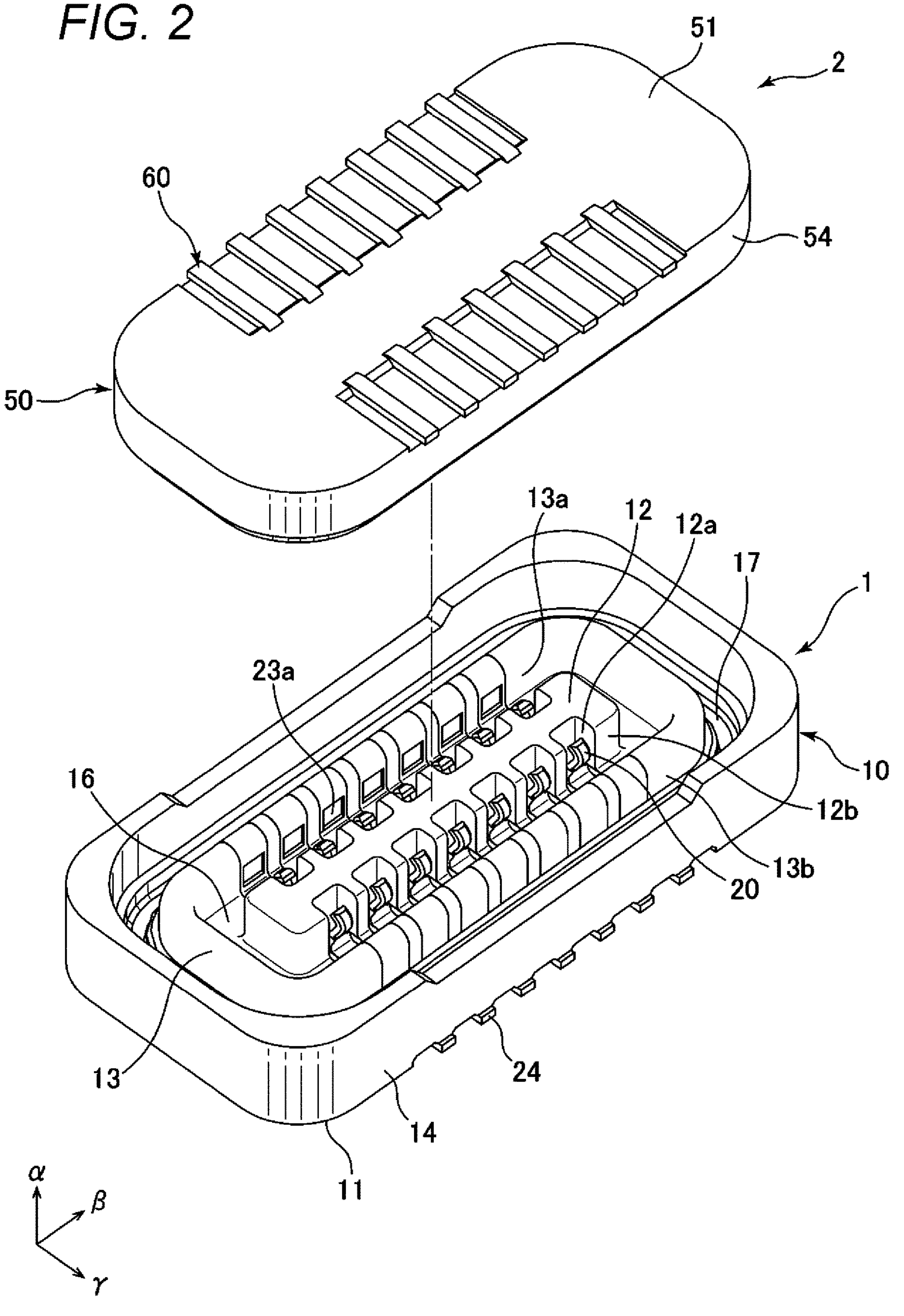
FIG. 2 is a perspective view showing only a plug connector of FIG. 1 in a vertically-reversed state.
Figure 3:
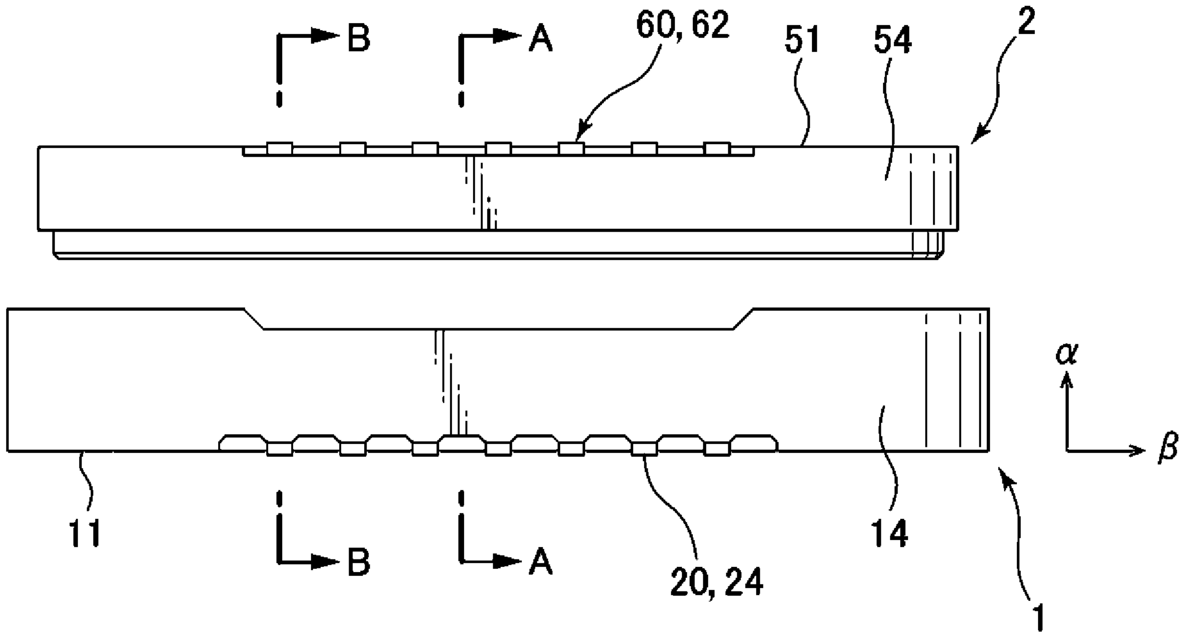
FIG. 3 is a side view of FIG. 2.

FIG. 1 is a perspective view of a connector assembly 3 according to one embodiment of the present disclosure, and specifically is a perspective view of a receptacle connector 1 and a plug connector 2 included in the connector assembly 3. FIG. 2 is a perspective view showing only the plug connector 2 of FIG. 1 in a vertically-reversed state, and FIG. 3 is a side view of FIG. 2. The receptacle connector 1 and the plug connector 2 are fitted to each other in postures shown in FIGS. 2 and 3 along a fitting direction "a." FIGS. 1 to 3 all show a state before fitting of the receptacle connector 1 and the plug connector 2.

Upon actual use, the receptacle connector 1 and the plug connector 2 are in board-to-board connection with each other in a state in which the receptacle connector 1 and the plug connector 2 are each fixed to not-shown separate circuit boards. Note that the present disclosure is broadly applicable not only to board-to-board connection type connector assemblies, but also connector assemblies employing other connection methods.

The receptacle connector 1 has a receptacle housing 10 and multiple receptacle signal terminals 20. The multiple receptacle signal terminals 20 are held on the receptacle housing 10, and are arrayed along a length direction "B" perpendicular to the fitting direction "a." The plug connector 2 has a plug housing 50 and multiple plug signal terminals 60. The multiple plug signal terminals 60 are held on the plug housing 50, and are arrayed along the length direction "B." In the present embodiment, the receptacle connector 1 has fourteen receptacle signal terminals 20. The plug connector 2 has fourteen plug signal terminals 60 corresponding to the receptacle signal terminals 20.

Each of the receptacle housing 10 and the plug housing 50 is integrally formed of an electric insulating material such as resin, and has a substantially rectangular parallelepiped outer shape. The receptacle housing 10 may have, for example, a dimension of about 2 to 10 mm in the length direction "β" and a dimension of about 1 to 5 mm in a width direction "γ" perpendicular to both the fitting direction "α" and the length direction "β." The plug housing 50 has a size corresponding to that of the receptacle housing 10.

The receptacle signal terminals 20 are held on the receptacle housing 10 by insert molding. Using the receptacle signal terminals 20 held by insert molding, the receptacle connector 1 is soldered and fixed to the circuit board (not shown) on the bottom 11 side of the receptacle housing 10. Similarly, the plug signal terminals 60 are also held on the plug housing 50 by insert molding. Using the plug signal terminals 60 held by insert molding, the plug connector 2 is soldered and fixed to the circuit board (not shown) on the bottom 51 side of the plug housing 50.

Figure 4:
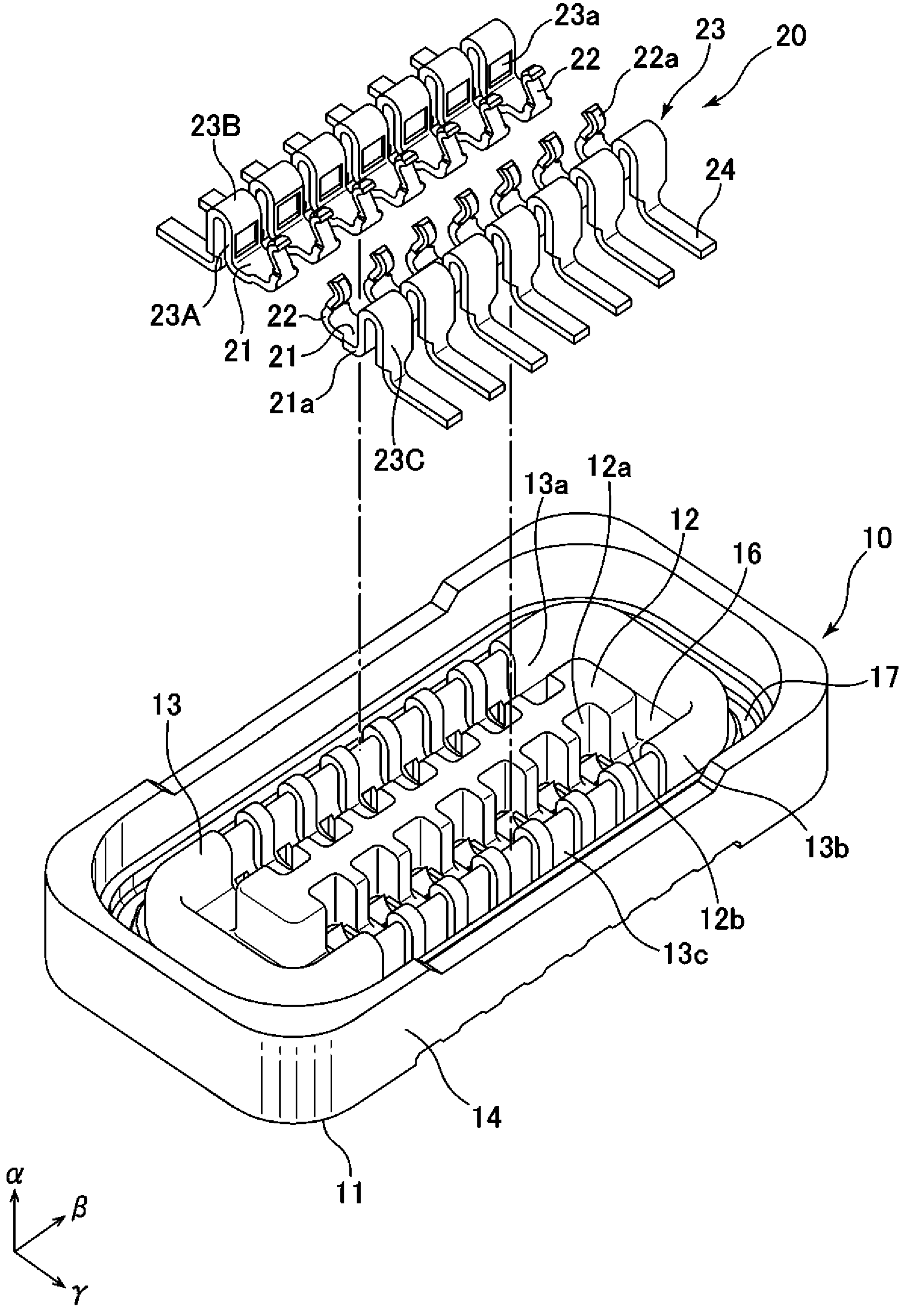
FIG. 4 is an exploded perspective view of a receptacle connector.

FIG. 4 shows an exploded perspective view of the receptacle connector 1.

Specifically, FIG. 4 is a perspective view of the receptacle signal terminals 20 and the receptacle connector 1 from which the receptacle signal terminals 20 are detached, i.e., the receptacle housing 10. Note that as described above, the receptacle signal terminals 20 are held on the receptacle housing 10 by insert molding. Thus, in an actual manufacturing process, the receptacle housing 10 is not in the state shown in FIG. 4, and for this reason, it should be understood that FIG. 4 is a drawing merely for the sake of convenience for understanding the structure of the receptacle connector 1.

The receptacle housing 10 includes, in a fitting surface ("β-γ" plane) perpendicular to the fitting direction "α," a first receiving portion 16, a first inner peripheral wall 13, a recessed portion 17, and a first outer peripheral wall 14 in this order such that an island-shaped raised portion 12 is surrounded thereby.

The island-shaped raised portion 12 positioned at the center of the receptacle housing 10 is a substantially rectangular portion protruding to the side to be fitted to the plug connector 2 and extending along the length direction "β" in the fitting surface ("β-γ" plane). The island-shaped raised portion 12 is provided with terminal grooves **12*a* corresponding to the receptacle signal terminals 20. Each terminal groove 12*a* is inwardly recessed from an outer wall 12*b* of the island-shaped raised portion 12 in the width direction "γ," and is opened on the fitting side. Part of each receptacle signal terminal 20 is housed in an elastically deformable state in a corresponding one of the terminal grooves 12*a*. The side 11*a* (see FIGS. 7 to 9) of each terminal groove 12*a* opposite to the fitting side is closed by the receptacle housing 10**.

The first inner peripheral wall 13 is a substantially rectangular frame-shaped portion protruding to the fitting side, surrounding the periphery of the island-shaped raised portion 12 in the fitting surface ("β-γ" plane), and extending at least along the length direction "β" and the width direction "γ."

The first receiving portion 16 is a substantially rectangular recessed portion recessed to the opposite side of the fitting side, circumferentially formed between the island-shaped raised portion 12 and the first inner peripheral wall 13 in the fitting surface ("β-γ" plane), and extending at least along the length direction "β" and the width direction "γ."

The first outer peripheral wall 14 is a substantially rectangular frame-shaped portion protruding to the fitting side, surrounding the periphery of the first inner peripheral wall 13 in the fitting surface ("β-γ" plane), and extending at least along the length direction "β" and the width direction "γ." In the present embodiment, the first outer peripheral wall 14 forms the outermost wall of the receptacle housing 10. Note that the first outer peripheral wall 14 does not necessarily form the outermost wall.

The recessed portion 17 is a substantially rectangular recessed portion recessed to the opposite side of the fitting side, circumferentially formed between the first inner peripheral wall 13 and the first outer peripheral wall 14 in the fitting surface ("β-γ" plane), and extending at least along the length direction "β" and the width direction "γ."

The receptacle signal terminals 20 are arrayed, along the length direction "β," in two rows in the width direction "γ," and each row includes multiple (seven in the present embodiment) receptacle signal terminals 20. These two rows of the receptacle signal terminals 20 are symmetrical with respect to the island-shaped raised portion 12 in the width direction "γ," and are arranged so as to face each other.

Each receptacle signal terminal 20 held on the receptacle housing 10 includes, in a direction apart from the island-shaped raised portion 12, an elastic contact portion 22, a base portion 21, a substantially inverted U-shaped portion 23, and a first connection portion 24 in this order along the width direction "γ."

The base portion 21 is a portion extending along the width direction "γ" in the bottom 11 of the receptacle housing 10, and is formed relatively widely in the length direction "β." The base portion 21 closes a hole **11*b* (see FIGS. 7 to 9) of the bottom 11 of the receptacle housing 10, thereby forming part of the bottom 11 of the receptacle housing 10. The bottom 11 of the receptacle housing 10 is fully closed using the base portions 21, and therefore, the first receiving portion 16 is not visible from the bottom 11 of the receptacle connector 1**.

The elastic contact portion 22 is a portion extending in a cantilever manner from the bottom 11 of the receptacle housing 10 toward the fitting side and curved in a substantially S-shape. An end portion of the elastic contact portion 22 opposite to the fitting side is connected to one end portion of the base portion 21 in the width direction "γ," and therefore, is supported on the base portion 21. In an area near a fitting-side free end of the elastic contact portion 22, a contact portion **22*a* configured to contact the plug signal terminal 60 of the plug connector 2 when the receptacle connector 1 and the plug connector 2** are fitted to each other is provided.

Figure 5:
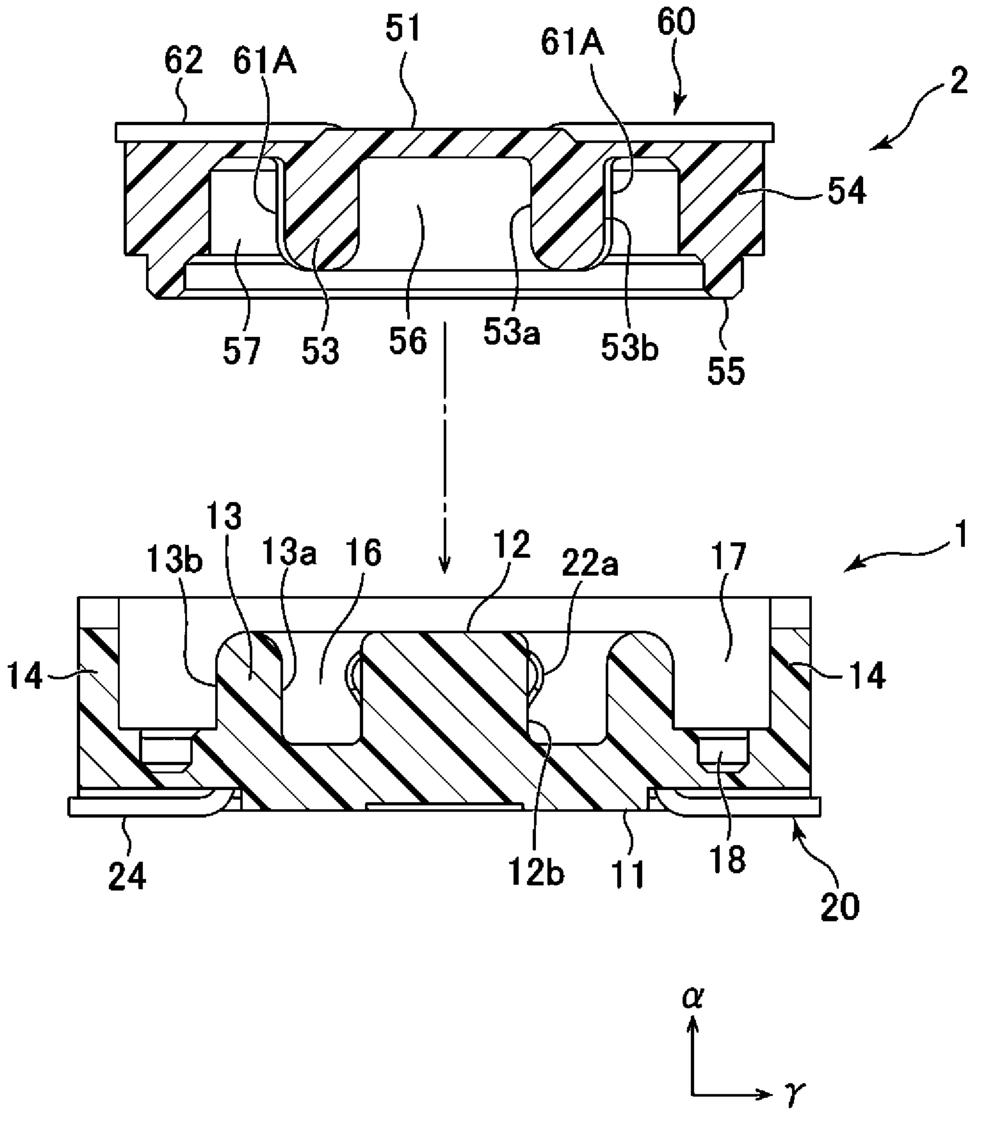
FIG. 5 is a sectional view along an A-A line of FIG. 3.

FIG. 5 shows a sectional view along an A-A line of FIG. 3. The elastic contact portion 22 is housed in an elastically deformable state in the terminal groove **12*a* of the island-shaped raised portion 12. Even when the elastic contact portion 22 is housed in the terminal groove 12*a*, at least part of the contact portion 22*a* of the elastic contact portion 22 is placed so as to protrude from the outer wall 12*b* of the island-shaped raised portion 12 toward the first receiving portion 16 side (later-described inner portion 23A side of the substantially inverted U-shaped portion 23) in the width direction "γ." With such arrangement, the plug signal terminal 60 of the plug connector 2 fitted in the first receiving portion 16 and the contact portion 22***a* more reliably contact each other when the receptacle connector 1 and the plug connector 2 are fitted to each other.

Figure 7:
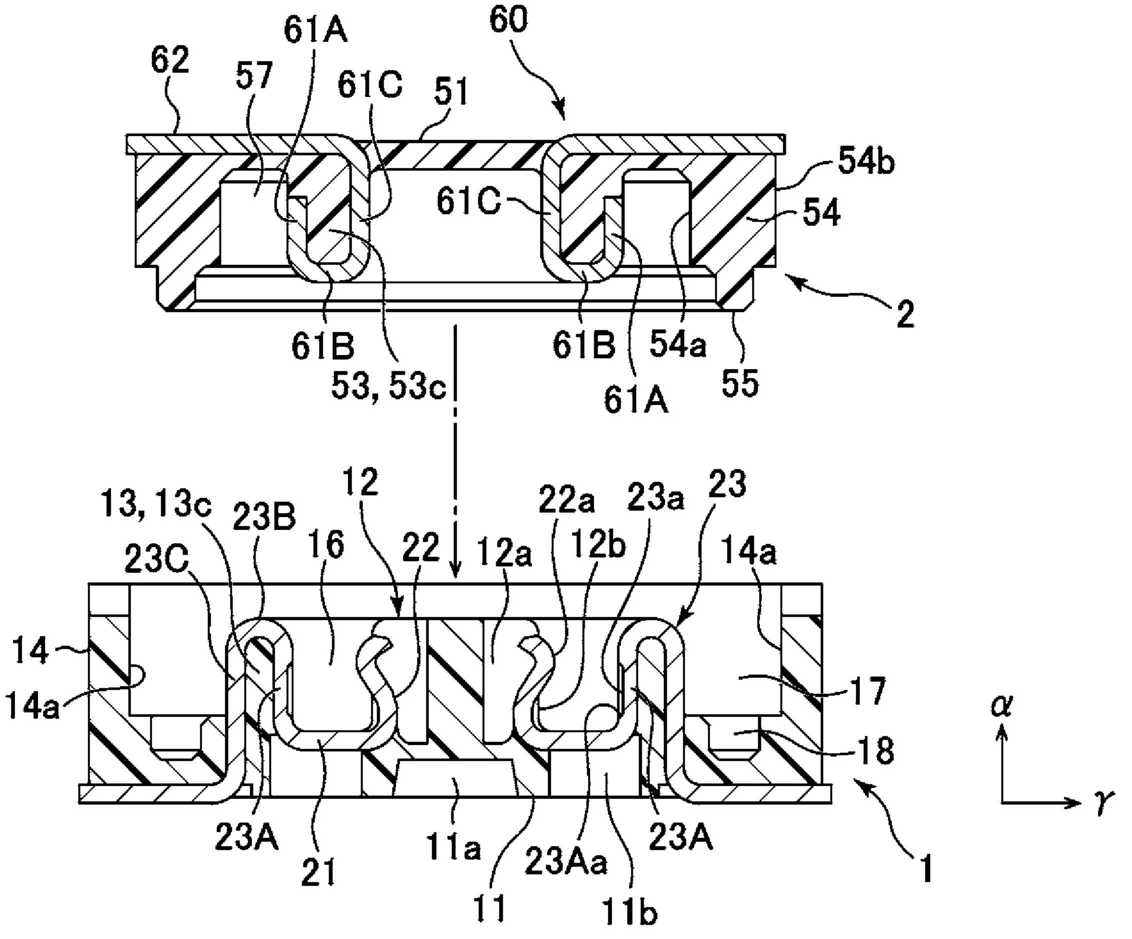
FIG. 7 is a view in a section along a B-B line of FIG. 3, FIG. 7 showing, step by step, a process of fitting the receptacle connector and the plug connector to each other.

The substantially inverted U-shaped portion 23 is held on the first inner peripheral wall 13 with part 13*c* of the first inner peripheral wall 13 positioned inside the U-shape (see FIG. 7). In other words, resin flows into the U-shape of the substantially inverted U-shaped portion 23 in insert molding, and accordingly, the receptacle signal terminal 20 is fixed to the first inner peripheral wall 13. Moreover, in insert molding, the outer surface of the substantially inverted U-shaped portion 23 held on the first inner peripheral wall 13 forms the same surface as those of, e.g., an inner wall 13*a* and an outer wall 13*b* of the first inner peripheral wall 13, i.e., is formed flush with the surfaces of the inner wall 13*a* and the outer wall 13*b*. Note that the outer surface is not necessarily flush with the surfaces of these walls.

As in the base portion 21, the substantially inverted U-shaped portion 23 is formed relatively widely in the length direction "β." The substantially inverted U-shaped portion 23 mainly includes three portions, i.e., an inner portion 23A positioned close to the island-shaped raised portion 12 in the width direction "γ" and provided on the inner wall 13*a* side of the first inner peripheral wall 13, an outer portion 23C positioned far from the island-shaped raised portion 12 in the width direction "γ" and provided on the outer wall 13*b* side of the first inner peripheral wall 13, and a raised curved portion 23B coupling the inner portion 23A and an end portion of the outer portion 23C on the fitting-side.

The inner portion 23A of the substantially inverted U-shaped portion 23 forms, together with the base portion 21 and the island-shaped raised portion 12, part of the first receiving portion 16. The outer surface of the inner portion 23A, i.e., part of the first receiving portion 16, is provided with a recessed portion 23*a* such that a predetermined portion of the plug signal terminal 60 of the plug connector 2 is hooked on the recessed portion 23*a* when the receptacle connector 1 and the plug connector 2 are fitted to each other. With the recessed portion 23*a*, connection between the receptacle signal terminal 20 and the plug signal terminal 60 is easily maintained. An end portion of the inner portion 23A opposite to the fitting side is connected to the other end portion of the base portion 21 in the width direction "γ", i.e., an end portion opposite to the one end portion connected to the end portion of the elastic contact portion 22. As a result, the end portions of the elastic contact portion 22 and the inner portion 23A are coupled to each other through the base portion 21.

The first connection portion 24 is a portion to be used as a soldering portion for the circuit board. The first connection portion 24 is coupled to an end portion of the outer portion 23C opposite to the fitting side, and extends along the width direction "γ" with the same width in the length direction "β."

Figure 6:
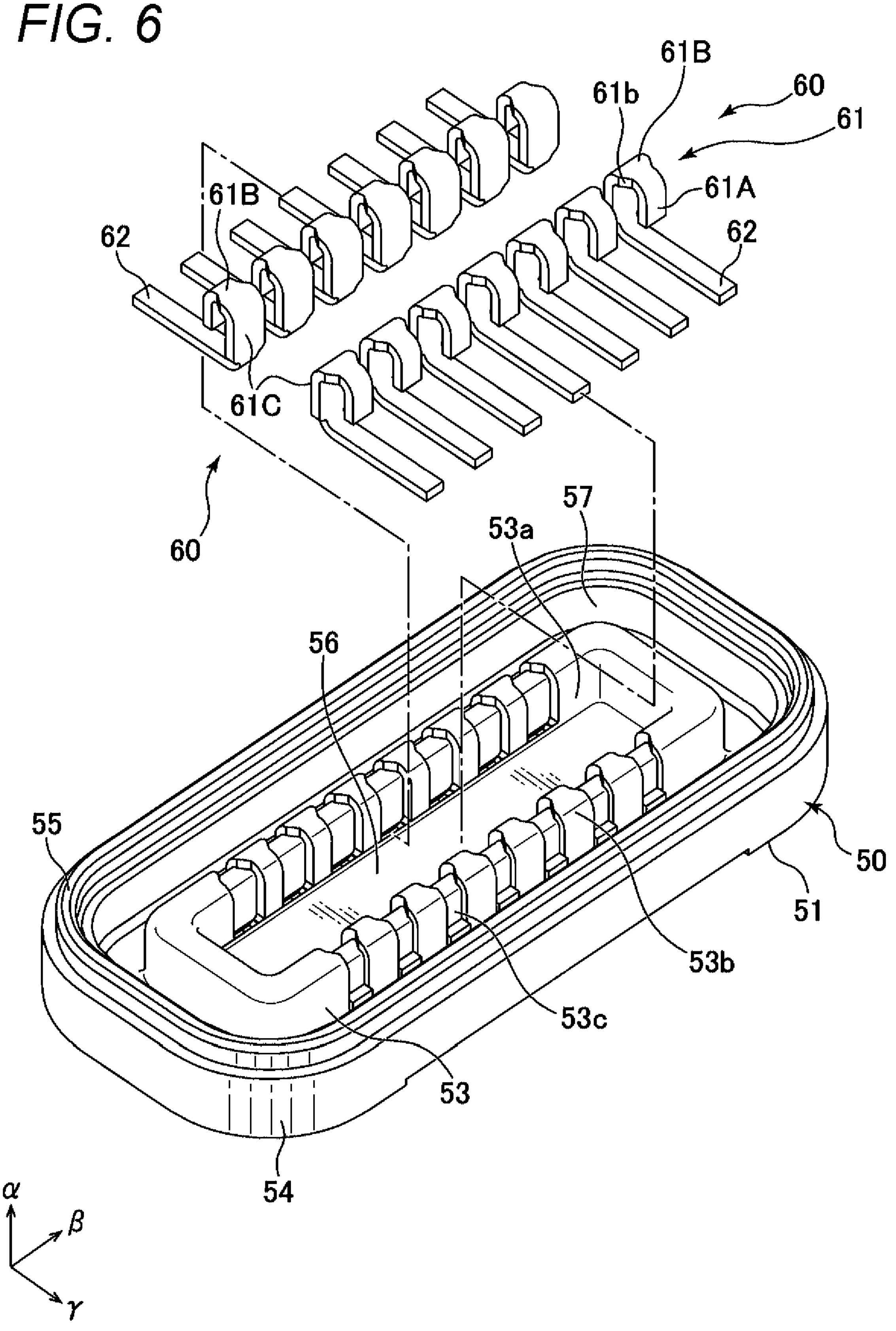
FIG. 6 is an exploded perspective view of the plug connector.

FIG. 6 shows an exploded perspective view of the plug connector 2. Specifically, FIG. 6 is a perspective view of the plug signal terminals 60 and the plug connector 2 from which the plug signal terminals 60 are detached, i.e., the plug housing 50. Note that as described above, the plug signal terminals 60 are held on the plug housing 50 by insert molding. Thus, as in FIG. 4, it should be understood that FIG. 6 is a drawing merely for the sake of convenience for understanding the structure of the plug connector 2.

The plug housing 50 includes, in the fitting surface ("β-γ" plane) perpendicular to the fitting direction "α," a second inner peripheral wall 53, a second receiving portion 57, and a second outer peripheral wall 54 in this order such that an island-shaped recessed portion 56 is surrounded thereby.

The second inner peripheral wall 53 is a substantially rectangular frame-shaped portion protruding to the side of the plug connector 2 to be fitted to the receptacle connector 1, circumferentially formed in the fitting surface ("β-γ" plane), and extending at least along the length direction "β" and the width direction "γ." The second inner peripheral wall 53 is fitted in the first receiving portion 16 upon fitting of the receptacle connector 1 and the plug connector 2.

The island-shaped recessed portion 56 positioned at the center of the plug connector 2 is a substantially rectangular recessed portion recessed to the opposite side of the fitting side, formed inside the second inner peripheral wall 53 in the fitting surface ("β-γ" plane), and extending at least along the length direction "β" and the width direction "γ." The island-shaped raised portion 12 is fitted in the island-shaped recessed portion 56 upon fitting of the receptacle connector 1 and the plug connector 2.

The second outer peripheral wall 54 is a substantially rectangular frame-shaped portion protruding to the fitting side, surrounding the periphery of the second inner peripheral wall 53 in the fitting surface ("β-γ" plane), and extending at least along the length direction "β" and the width direction "γ." In the present embodiment, the second outer peripheral wall 54 forms the outermost wall of the plug housing 50. Note that the second outer peripheral wall 54 does not necessarily form the outermost wall. The second outer peripheral wall 54 is fitted in the recessed portion 17 upon fitting of the receptacle connector 1 and the plug connector 2.

In order to enhance a waterproof function, a stepped portion 55 tapered on the fitting side may be provided on the fitting side of the second outer peripheral wall 54. Corresponding thereto, a stepped recessed portion 18 in a complementary shape for the stepped portion 55 is provided at the recessed portion 17 of the receptacle connector 1. As described above, the waterproof function may be enhanced in such a manner that an additional configuration is added to the second outer peripheral wall 54 of the plug connector 2 and the recessed portion 17 of the receptacle connector 1. Needless to say, such a configuration is not necessarily in the step shape, and may be in other shapes such as a smooth slope surface.

The plug signal terminals 60 are arrayed, along the length direction "β," in two rows in the width direction "γ," and each row includes multiple (seven in the present embodiment) plug signal terminals 60. These two rows of the plug signal terminals 60 are symmetrical with respect to the island-shaped recessed portion 56 in the width direction "γ," and are arranged so as to face each other.

Each plug signal terminal 60 held on the plug housing 50 includes, in a direction apart from the island-shaped recessed portion 56, a substantially inverted U-shaped portion 61 and a second connection portion 62 in this order along the width direction "γ."

The substantially inverted U-shaped portion 61 is held on the second inner peripheral wall 53 with part 53*c* of the second inner peripheral wall 53 positioned inside the U-shape (see FIG. 7). In other words, resin flows into the U-shape of the substantially inverted U-shaped portion 61 in insert molding, and accordingly, the plug signal terminal 60 is fixed to the second inner peripheral wall 53.

The substantially inverted U-shaped portion 61 mainly includes three portions, i.e., an inner portion 61A positioned close to the island-shaped recessed portion 56 in the width direction "γ" and provided on the inner wall 53*a* side of the second inner peripheral wall 53, an outer portion 61C positioned far from the island-shaped recessed portion 56 in the width direction "γ" and provided on the outer wall 53*b* side of the second inner peripheral wall 53, and a top portion 61B coupling the inner portion 61A and an end portion of the outer portion 61C on the fitting side.

In insert molding, the outer surfaces of the top portion 61B and the outer portion 61C form the same surface as those of, e.g., an inner wall 53*a* and an outer wall 53*b* of the second inner peripheral wall 53, i.e., are formed flush with the surfaces of the inner wall 53*a* and the outer wall 53*b*. On the other hand, as clearly shown in FIG. 5, the outer surface of the inner portion 61A of the substantially inverted U-shaped portion 61 slightly protrudes into the second receiving portion 57 with respect to the outer wall 53*b* of the second inner peripheral wall 53, i.e., is placed not flush with the outer wall 53*b*. With such arrangement, the inner portion 61A of the substantially inverted U-shaped portion 61 can more reliably contact the receptacle signal terminal 20 of the receptacle connector 1, specifically the recessed portion 23*a* provided in the inner portion 23A of the receptacle signal terminal 20 formed flush with the inner wall 13*a* of the first inner peripheral wall 13, when the receptacle connector 1 and the plug connector 2 are fitted to each other.

The outer portion 61C is a portion configured to contact the contact portion 22*a* of the receptacle signal terminal 20 when the receptacle connector 1 and the plug connector 2 are fitted to each other, and therefore, in order to more reliably make such contact, is formed relatively widely in the length direction "β" as compared to the inner portion 61A and the top portion 61B.

The second connection portion 62 is a portion to be used as a soldering portion for the circuit board. The second connection portion 62 is coupled to an end portion of the outer portion 61C opposite to the fitting side, and extends along the width direction "γ" with the same width in the length direction "β."

Figure 8:
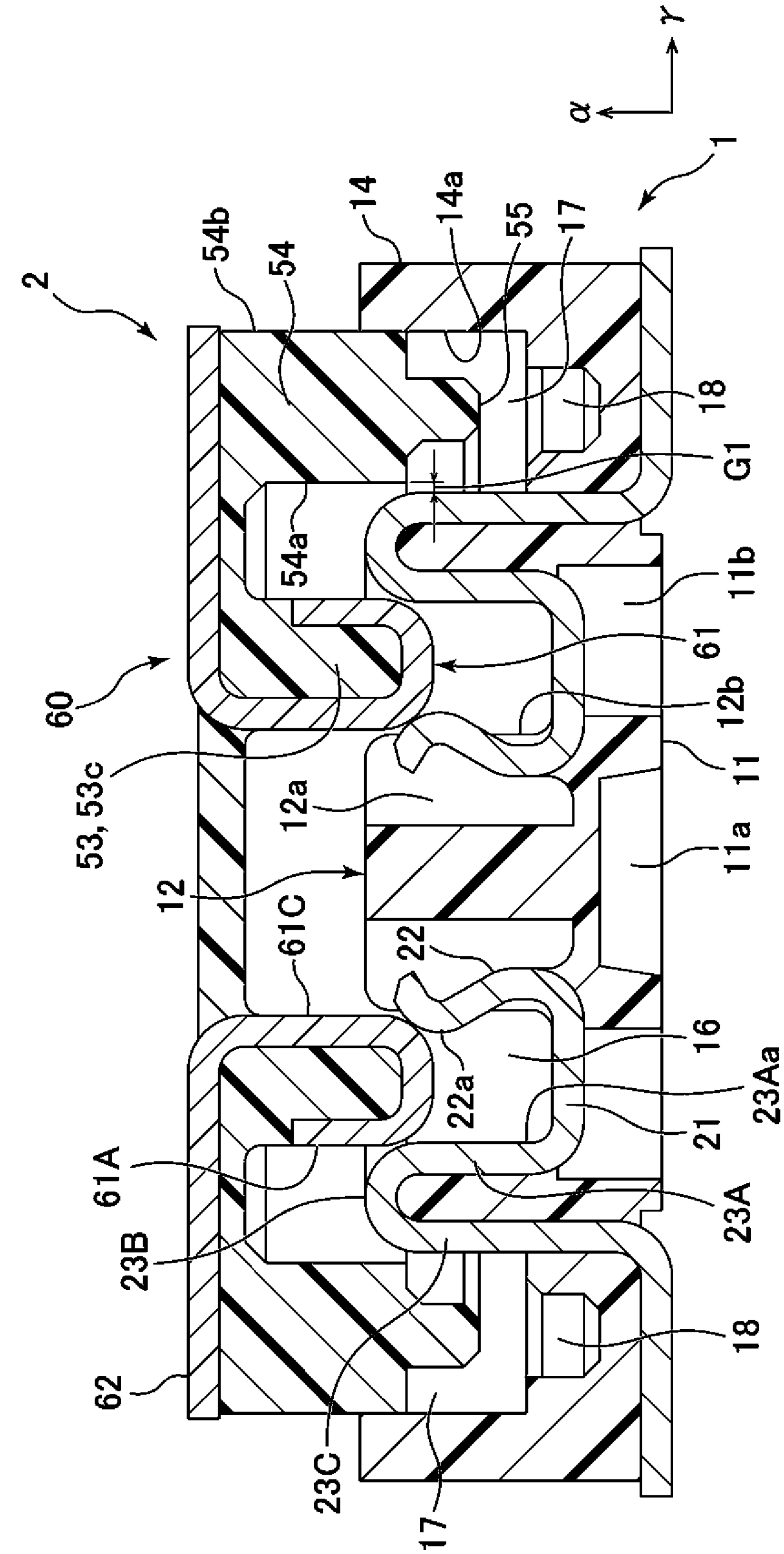
FIG. 8 is a view in the section along the B-B line of FIG. 3, FIG. 8 showing, step by step, the process of fitting the receptacle connector and the plug connector to each other.
Figure 9:
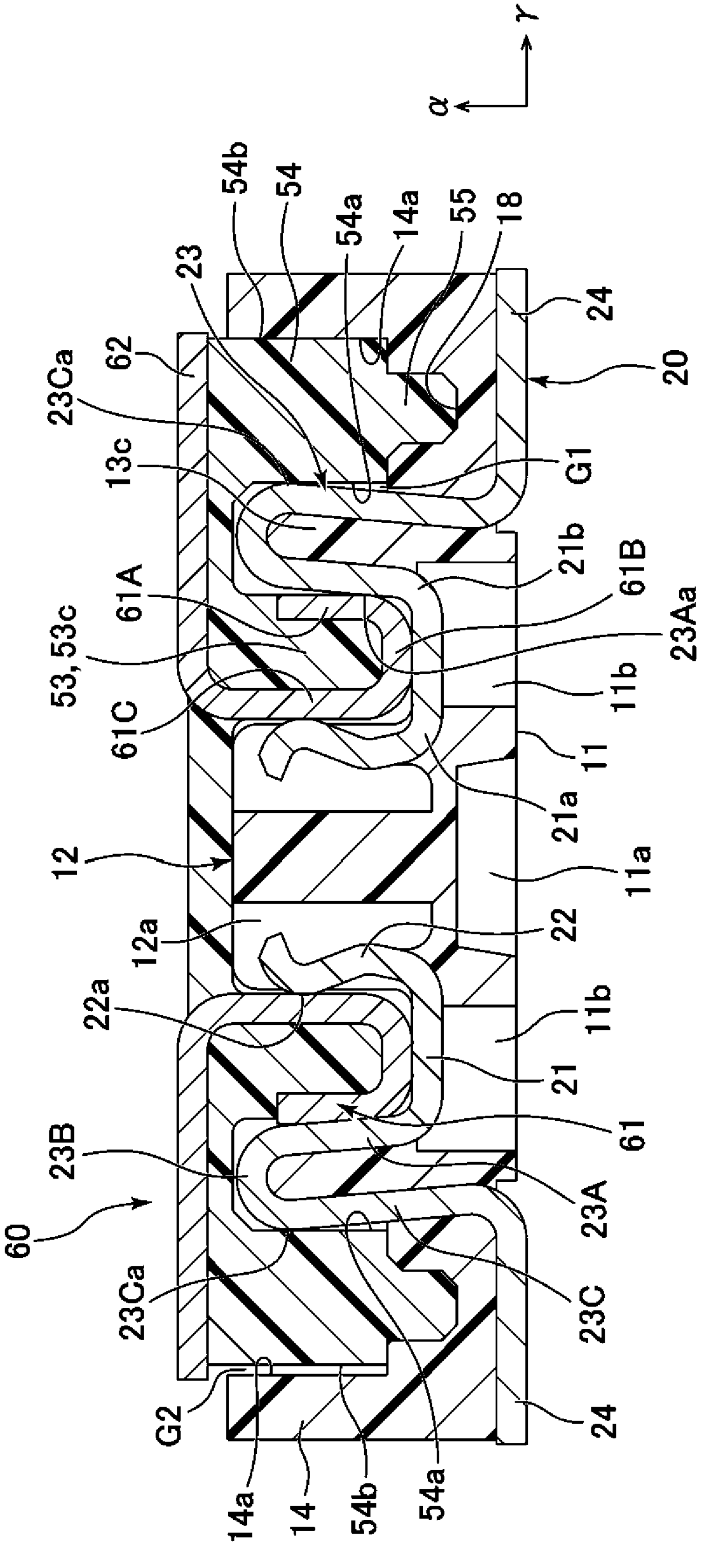
FIG. 9 is a view in the section along the B-B line of FIG. 3, FIG. 9 showing, step by step, the process of fitting the receptacle connector and the plug connector to each other.

A structural principle for waterproofing according to the present disclosure will be described with reference to FIGS. 7 to 9. FIGS. 7 to 9 are views in a section along a B-B line of FIG. 3, and show, step by step, a process of fitting the receptacle connector 1 and the plug connector 2 to each other. FIG. 7 shows a state before fitting, FIG. 8 shows a state in the middle of fitting, and FIG. 9 shows a state after completion of fitting.

As clearly seen from FIGS. 7 and 8, after fitting has been started, the island-shaped raised portion 12 of the receptacle connector 1 is fitted in the island-shaped recessed portion 56 of the plug connector 2, the second inner peripheral wall 53 of the plug connector 2 is fitted in the first receiving portion 16 of the receptacle connector 1, and the second outer peripheral wall 54 of the plug connector 2 is fitted in the recessed portion 17 of the receptacle connector 1. By these multiple fitted portions, a water entrance path is blocked, and the waterproof function is improved.

The second inner peripheral wall 53 of the plug connector 2 and the first receiving portion 16 of the receptacle connector 1 upon fitting will be described. As shown in FIG. 9, the outer portion 61C of each plug signal terminal 60 held on the second inner peripheral wall 53 contacts, upon fitting, the contact portion 22*a*, which protrudes into the first receiving portion 16, of the elastic contact portion 22 of a corresponding one of the receptacle signal terminals 20. At the same time as such contact, the inner portion 61A of each plug signal terminal 60 contacts the inner portion 23A of the substantially inverted U-shaped portion 23 of a corresponding one of the receptacle signal terminals 20.

Since the receptacle signal terminals 20 and the plug signal terminals 60 contact each other as described above, the receptacle signal terminals 20 are displaced. As a result, part of the displaced receptacle signal terminals 20 abuts the second outer peripheral wall 54 of the plug connector 2.

Next, abutment of part of the displaced receptacle signal terminals 20 with the second outer peripheral wall 54 of the plug connector 2 will be described in detail. As shown in FIG. 9, at least after fitting has been completed, the inner portion 61A of each plug signal terminal 60 contacts the inner portion 23A of the substantially inverted U-shaped portion 23 of a corresponding one of the receptacle signal terminals 20. In FIG. 9, the inner portion 61A of each plug signal terminal 60 in particular contacts (lower) part 23 Aa of the inner portion 23A opposite to the fitting side. Specifically, the part 23 Aa of the inner portion 23A opposite to the fitting side is, for example, part near the edge of the recessed portion 23*a* of the inner portion 23A.

Note that the position of contact between the inner portion 61A of the plug signal terminal 60 and the part 23Aa of the inner portion 23A of the substantially inverted U-shaped portion 23 of the receptacle signal terminal 20 may be hereinafter referred to as a contact position (61A, 23Aa).

The substantially inverted U-shaped portion 23, for example, tilts at the contact position (61A, 23Aa), which serves as a supporting point, and the substantially inverted U-shaped portion 23 is thereby displaced.

Note that in order for the substantially inverted U-shaped portion 23 to displace, a clearance "G1" is formed between the outer portion 23C of the substantially inverted U-shaped portion 23 and an inner wall 54*a* of the second outer peripheral wall 54 (see FIGS. 8 and 9).

By displacement of the substantially inverted U-shaped portion 23, the outer portion 23C of the substantially inverted U-shaped portion 23, e.g., part 23Ca of the outer portion 23C on the fitting (upper) side, abuts the inner wall 54*a* of the second outer peripheral wall 54. The part 23Ca of the outer portion 23C abuts the inner wall 54*a* of the second outer peripheral wall 54 in a plane (in other words, "α-β" plane formed in the fitting direction "α" and the length direction "β") perpendicular to the width direction "γ."

Note that the position of abutment between the part 23Ca of the outer portion 23C of the substantially inverted U-shaped portion 23 and the inner wall 54*a* of the second outer peripheral wall 54 may be hereinafter referred to as an abutment position (23Ca, 54*a*). Moreover, the part 23Ca of the outer portion 23C of the substantially inverted U-shaped portion 23 abutting the inner wall 54*a* of the second outer peripheral wall 54 may be referred to as a first abutment portion.

As shown in FIG. 9, in the state after completion of fitting, the water entrance path is blocked at least at the abutment position (23Ca, 54*a*). As a result, the waterproof function of the connector assembly 3 can be improved.

Further, in a case where the outer surface of the outer portion 23C of the substantially inverted U-shaped portion 23 forms the same surface as that of the outer wall 13*b* of the first inner peripheral wall 13 (e.g., formed flush with the outer wall 13*b*), a peripheral portion of the first inner peripheral wall 13 holding the outer portion 23C also displaces together with the outer portion 23C of the substantially inverted U-shaped portion 23. As a result, at least part of the outer wall 13b of the first inner peripheral wall 13 abuts the inner wall 54a of the second outer peripheral wall 54.

Note that the position of abutment between the outer wall 13b of the first inner peripheral wall 13 and the inner wall 54a of the second outer peripheral wall 54 may be hereinafter referred to as an abutment position (13b, 54a). Moreover, the at least part of the first inner peripheral wall 13 abutting the inner wall 54a of the second outer peripheral wall 54 may be referred to as a second abutment portion.

In a case where the at least part of the displaced first inner peripheral wall 13 abuts the inner wall 54a of the second outer peripheral wall 54 as described above, the water entrance path is blocked not only at the abutment position (23Ca, 54a) between the receptacle signal terminal 20 (part 23Ca of the outer portion 23C) and the plug housing 50 (inner wall 54a of the second outer peripheral wall 54), but also at the abutment position (13b, 54a) between the receptacle housing 10 (outer wall 13b of the first inner peripheral wall 13) and the plug housing 50 (inner wall 54a of the second outer peripheral wall 54). As a result, the waterproof function of the connector assembly 3 can be further improved.

Force which needs to be applied in the fitting direction "α" to displace the substantially inverted U-shaped portion 23 changes according to a positional relationship between the contact position (61A, 23Aa) and the abutment position (23Ca, 54a). In the present embodiment, the contact position (61A, 23 Aa) and the abutment position (23Ca, 54a) are separated from each other in the fitting direction "α." For example, as shown in FIG. 9, the contact position (61A, 23Aa) is positioned on the lower side with respect to the abutment position (23Ca, 54a) in the fitting direction "α." Thus, as compared to a case where the contact position (61A, 23Aa) and the abutment position (23Ca, 54a) are close to each other in the fitting direction "α," the force to be applied in the fitting direction to displace the substantially inverted U-shaped portion 23 can be decreased. The force in the present embodiment can be smaller than that in a typical structure in which a force application direction (fitting direction) and a press-fitting direction are the same as each other as disclosed in JP-A-2016-157529. This is because the force to be applied in the fitting direction "α" to displace the substantially inverted U-shaped portion 23 can be concentrated not on the entirety of the inner portion 23A but on the part 23 Aa of the inner portion 23A, i.e., substantially a point on the receptacle signal terminal 20, according to the configuration of the present embodiment. Also, this is because the force applied in the fitting direction "α" is converted into force in the width direction "γ" and repulsive force generated to displace the substantially inverted U-shaped portion 23 is not directly transmitted to a user.

Next, the second outer peripheral wall 54 of the plug connector 2 and the first outer peripheral wall 14 of the receptacle connector 1 will be described. In order to further improve the waterproof function, it may be configured such that the outer portion 23C of the displaced substantially inverted U-shaped portion 23 pressure-contacts the inner wall 54a of the second outer peripheral wall 54 through the abutment position (23Ca, 54a) with the inner wall 54a of the second outer peripheral wall 54 to push an outer wall 54b of the second outer peripheral wall 54 to the inner wall 14a side of the first outer peripheral wall 14 in the width direction "γ." With this configuration, the outer wall 54b of the second outer peripheral wall 54 is pressed against the inner wall 14a of the first outer peripheral wall 14 so that the outer wall 54b of the second outer peripheral wall 54 and the inner wall 14a of the first outer peripheral wall 14 can closely contact each other. Thus, the waterproof function can be enhanced not only on the inner wall 54a side of the second outer peripheral wall 54, but also the outer wall 54b side of the second outer peripheral wall 54.

Note that although not preferred in terms of waterproofing, a clearance "G2" (not shown) may be formed between the outer wall 54b of the second outer peripheral wall 54 and the inner wall 14a of the first outer peripheral wall 14 on one side of the island-shaped raised portion 12 and the island-shaped recessed portion 56, both of which are at the center in the width direction "γ," in order to smoothly fit the receptacle connector 1 and the plug connector 2 to each other. With the clearance "G2," the force to be applied upon fitting of the receptacle connector 1 and the plug connector 2 can be further decreased, and fitting can be smoothly made.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A connector assembly comprising:

a first connector; and a second connector fitted to the first connector, wherein the first connector has a first housing and a first terminal held on the first housing, the second connector has a second housing and a second terminal held on the second housing, the first housing has an island-shaped raised portion, a first inner peripheral wall, a first receiving portion, a first outer peripheral wall, and a recessed portion, the island-shaped raised portion protrudes to a fitting side to be fitted to the second connector, and extends along a length direction of the first connector, the first inner peripheral wall protrudes to the fitting side, and surrounds a periphery of the island-shaped raised portion, the first receiving portion is recessed to an opposite side of the fitting side, and is circumferentially formed between the island-shaped raised portion and the first inner peripheral wall, the first outer peripheral wall protrudes to the fitting side, and surrounds a periphery of the first inner peripheral wall, the recessed portion is recessed to the opposite side of the fitting side, and is circumferentially formed between the first inner peripheral wall and the first outer peripheral wall, the second housing has a second inner peripheral wall, an island-shaped recessed portion, a second outer peripheral wall, and a second receiving portion, the second inner peripheral wall protrudes to a fitting side to be fitted to the first connector, is circumferentially formed, and is received by the first receiving portion upon fitting of the first connector and the second connector, the island-shaped recessed portion is recessed to an opposite side of the fitting side and is formed inside the second inner peripheral wall, and the island-shaped raised portion is fitted in the island-shaped recessed portion upon fitting of the first connector and the second connector, the second outer peripheral wall protrudes to the fitting side, surrounds a periphery of the second inner peripheral wall, and is fitted in the recessed portion upon fitting of the first connector and the second connector, the second receiving portion is recessed to the opposite side of the fitting side and is circumferentially formed between the second inner peripheral wall and the second outer peripheral wall, and the first inner peripheral wall is fitted in the second receiving portion upon fitting of the first connector and the second connector, and upon fitting of the first connector and the second connector, the first terminal is displaced by contact between the first terminal and the second terminal, and part of the displaced first terminal abuts an inner wall of the second outer peripheral wall.

2. The connector assembly according to claim 1, wherein upon fitting of the first connector and the second connector, the first inner peripheral wall is displaced together with the first terminal, and at least part of the displaced first inner peripheral wall abuts the inner wall of the second outer peripheral wall.

3. The connector assembly according to claim 1, wherein the first terminal includes a substantially inverted U-shaped portion held on the first inner peripheral wall, and the substantially inverted U-shaped portion has an inner portion, an outer portion, and a raised curved portion, the inner portion is positioned close to the island-shaped raised portion in a width direction of the first connector, and is provided on an inner wall side of the first inner peripheral wall, the outer portion is positioned far from the island-shaped raised portion in the width direction, and is provided on an outer wall side of the first inner peripheral wall, the raised curved portion couples the inner portion and an end portion of the outer portion on the fitting-side, and upon fitting of the first connector and the second connector, the substantially inverted U-shaped portion is displaced by contact between the inner portion of the substantially inverted U-shaped portion and the second terminal, and part of the outer portion of the displaced substantially inverted U-shaped portion abuts the inner wall of the second outer peripheral wall.

4. The connector assembly according to claim 3, wherein the first terminal further has an elastic contact portion and a base portion, the elastic contact portion has, on the fitting side, a contact portion contacting the second terminal, the contact portion protrudes, in the width direction, from the island-shaped raised portion to a side of the inner portion of the substantially inverted U-shaped portion, the base portion couples an end portion of the elastic contact portion opposite to the fitting side and an end portion of the inner portion of the substantially inverted U-shaped portion, and the inner portion, the base portion, and the island-shaped raised portion form part of the first receiving portion.

5. The connector assembly according to claim 3, wherein a position of abutment where part of the outer portion of the substantially inverted U-shaped portion abuts the inner wall of the second outer peripheral wall and a position of contact where the inner portion of the substantially inverted U-shaped portion contacts the second terminal are separated from each other in a fitting direction where the first connector and the second connector are fitted.

6. The connector assembly according to claim 3, wherein upon fitting of the first connector and the second connector, an outer wall of the second outer peripheral wall is pressed in the width direction by abutment between part of the outer portion of the substantially inverted U-shaped portion and the inner wall of the second outer peripheral wall, and the outer wall of the second outer peripheral wall and an inner wall of the first outer peripheral wall closely contact each other.

7. The connector assembly according to claim 6, wherein upon fitting of the first connector and the second connector, a clearance is formed between the outer wall of the second outer peripheral wall and the inner wall of the first outer peripheral wall on one side of the island-shaped raised portion and the island-shaped recessed portion, both of which are at a center in the width direction.

8. The connector assembly according to claim 1, wherein part of the second outer peripheral wall on the fitting side is tapered toward the fitting side.

* * * * *